March 14, 1950
D. P. BERNHEIM
2,500,654
OPHTHALMIC MOUNTING HAVING CLAMP TYPE
RIM AND TEMPLE CONNECTOR
Filed Aug. 19, 1948
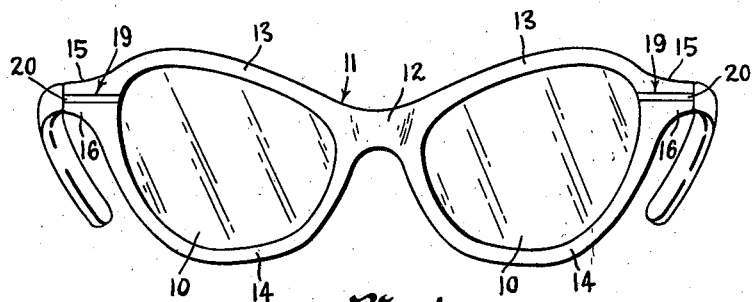
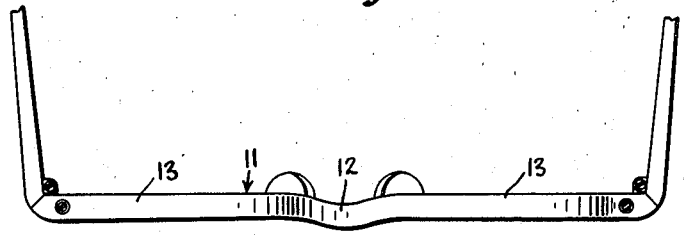
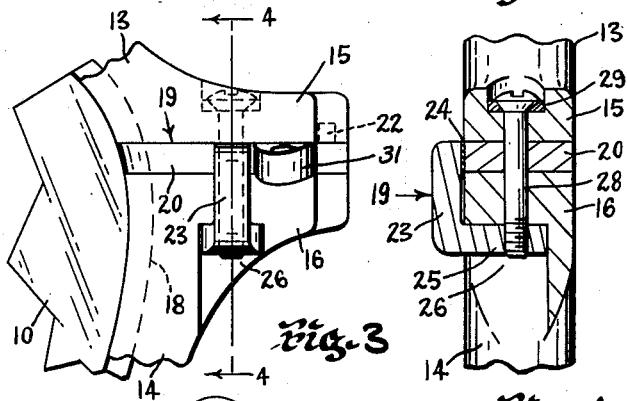
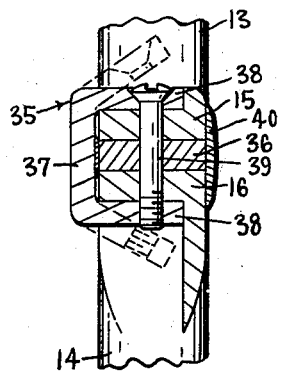
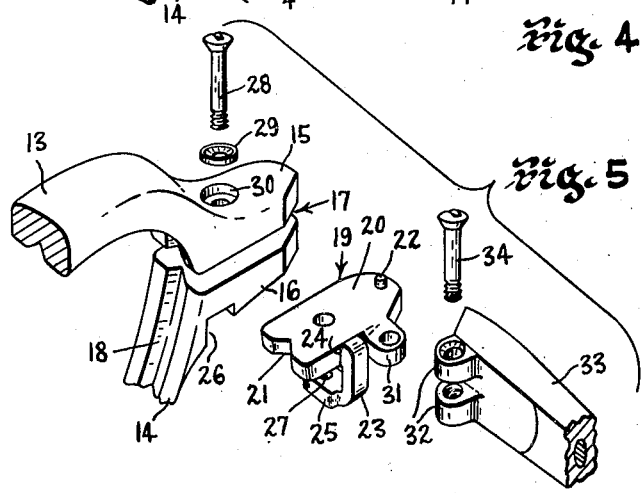
INVENTOR.
DANIEL P. BERNHEIM
BY
Louis L. Gagnon
ATTORNEY Patented Mar. 14, 1950

2,500,654

UNITED STATES PATENT OFFICE 2,500,654

OPHTHALMIC MOUNTING HAVING CLAMP TYPE RIM AND TEMPLE CONNECTOR

Daniel P. Bernheim, Southbridge, Mass., assignor to American Optical Company, Southbridge, Mass., a voluntary association of Massachusetts Application August 19, 1948, Serial No. 45,140

3 Claims. (Cl. 88—53)

This invention relates to improvements in ophthalmic mountings of the type having divided rim portions with the meeting ends being adjacent the temporal sides of the lenses and relates more particularly to the provision of novel and efficient connection means for securing the meeting ends together and for simultaneously providing means to which temples may be pivotally connected.

One of the principal objects of the invention is to provide an ophthalmic mounting of the type formed of non-metallic material having divided rim portions with novel means for connecting said divided portions whereby lenses may be quickly and easily inserted in or removed from the rims without the necessity of heating and stretching the rim.

Another important object is to provide an ophthalmic mounting of the above character having a relatively thin decorative surface coating of metal or other similar material thereon and a novel clamp arrangement for aligning and securing the divided portions of the rims together whereby lenses may be readily inserted in or removed from the rims without danger of injuring the decorative coating and which further includes means for independently connecting temples thereto.

Another object is to provide an ophthalmic mounting of the above character with means for connecting the divided portions of the rims which is of such nature that the ends of the rims may be connected or disconnected to permit the insertion or removal of lenses without disturbing the temple connection or the temples may be attached to or removed therefrom without disturbing the rim connections.

Another object is to provide an ophthalmic mounting of the above character having lens encircling rim members divided in the temporal regions thereof, said divided end portions of the rim members having substantially flat and parallel end surfaces thereon and having a metallic plate member disposed therebetween, said plate member having a connecting member thereon formed with an intermediate portion shaped to overlie the rear of one of the divided portions and further having an end portion lying within a recess formed in the outer edge surface of said divided end portion, said divided portions, the plate member, and the end of the connecting member lying within the recess having aligned openings therein and connecting means extending within said aligned openings for securely connecting them together, said plate member having means thereon independently connecting a temple member thereof.

Another object is to provide a device of the above character which is simple in its construction, durable and thoroughly efficient in its use, which may be readily assembled and adjusted and which is comparatively inconspicuous in use and economical to manufacture.

Other objects and advantages of the invention will become apparent from the following description taken in connection with the accompanying drawing, in which:

Fig. 1 is a front elevational view of an ophthalmic mounting embodying the invention;

Fig. 2 is a plan view of the mounting shown in Fig. 1;

Fig. 3 is a fragmentary rear view of a temporal portion of the mounting illustrated in Fig. 1 showing particularly the preferred embodiment of the means for connecting the divided portions of the rims;

Fig. 4 is a sectional view taken as on line 4—4 of Fig. 3 and looking in the direction indicated by the arrows;

Fig. 5 is an exploded view of a temporal end portion of the mounting, the attachment end of a temple, and the parts of the device forming the connecting means therefor; and Fig. 6 is a sectional view similar to Fig. 4 illustrating a modification of the invention.

In the manufacture of ophthalmic mountings formed of non-metallic material having continuous unbroken lens encircling rims, it is a common practice, when inserting lenses into the rims, to heat and stretch the rims until the lens openings are sufficiently enlarged to permit the insertion of lenses, after which the frame must be permitted to cool so that the rims will contract and assume a snug fit about the periphery of the lenses. This procedure is possible, however, only in instances where the frame material is of such a nature that it can be easily deformed and will return to its initial shape without damage to the parts or to the finish thereof. Since the present trend is toward commercialization of frames made of non-metallic material which have been coated with a metallic, lacquer or other finish, the above procedure is not suitable since upon heating and stretching the frame the finish will not maintain its bond with the non-metallic material and will crack, chip, wrinkle or otherwise become disfigured. Therefore, it is a desirable feature of the invention to provide means whereby such mountings may be quickly and easily assembled with the lenses and without danger of injury to the mounting.

Referring more particularly to the drawing wherein like characters of reference designate like parts throughout the several views, the device embodying the invention and which is adapted for use in supporting a pair of lenses 10, as illustrated in Figs. 1 through 5, relates to a supporting structure or frame 11. The supporting structure 11 comprises a front which embodies a bridge member 12 and integrally related rim members for surrounding the lenses, all formed of non-metallic material such as cellulose acetate, cellulose nitrate, methyl methacrylate or other known artificial resinous materials which preferably have an outer thin surface coating of metal, lacquer or other desirable finish thereon. The rim members each comprise a portion 13 shaped substantially to follow the upper contour edges of the lenses and a lower transverse portion 14 shaped substantially to follow the lower contour edges of the lenses. The upper and lower portions 13 and 14 are provided with divided end portions 15 and 16 having substantially flat and parallel end surfaces which are normally separated to provide a space 17 (Fig. 5) so that the portions 13 and 14 may be spread apart sufficiently to permit a lens 10 to be inserted in a continuous channel or groove 18 provided therefor throughout the inner contour surfaces of the rims.

To retain each of the lenses 10 in proper position in the rims there is provided a metal clip member 19 having a blade portion 20 of a size and shape for insertion in the space 17 between the end portions 15 and 16, the inner end of the blade 20 having a vertical groove or notch 21 shaped to be positioned in flush relation with the channel or groove 18. The upper surface of the blade 20 is provided with a short pin-like projection 22 which is adapted to fit within an opening provided therefor in the under surface of the upper end portion 15. The blade portion 20 has a substantially L-shaped arm 23 depending from the rear edge thereof formed integral with said blade portion 20 or fixed thereto by soldering, welding or the like as at 24. The vertical portion of the arm 23 extends downwardly from the rear edge of the blade portion 20 behind the end portion 16 of the lower rim portion 14 and has its forwardly extending base portion 25 disposed within a notch 26 formed in the under side or outer edge surface of the end portion 16. The base portion 25 of the arm 23 is provided with a vertical threaded opening 27 for reception of the threaded portion of a screw 28, which screw is adapted to extend downwardly into the opening 27 through a series of concentric openings formed in the end portions 15 and 16 and the blade portion 20 of the clip member 19. For partially concealing the screw 28 and thus enhancing the appearance of the device the head of the screw may reside flush with the surface of a countersunk washer 29, which washer is located in the counterbored portion 30 of the opening in the end portion 15 of the upper transverse arm 13.

The lens 10 is inserted in the groove 18 with the present construction by first loosening the connection screw 28 an amount sufficient to allow the ends 15 and 16 to be spread apart to permit the lens to be snapped inwardly of the rim and by thereafter tightening the screw to again draw the ends together. Care is taken during the insertion of the lens not to loosen the screw an amount sufficient to permit the parts to become disassociated. When the screw is tightened, the pin 22 will seat inwardly of the opening in the member 15 and will retain the parts in aligned relation with each other.

The rear edge of the blade portion 20 of each clip member 19 is provided adjacent the arm 23 with a rearwardly extending lug 31 which is adapted to be disposed between a pair of vertically spaced ears 32 provided on the inner surface of a temple member 33. The ears 32 and the lug 31 have concentric vertical openings therein for reception of a screw 34, the opening in the lower ear 32 being threaded for proper reception thereof, thus forming a neat, efficient and easily detachable hinge connection for the temple member 33. The lug 31 may be bent or inclined to angle the temple member 33 as desired.

It is particularly pointed out that the temple may be detached from the pivot lug 31 without disturbing the rim connection and likewise the rim connection may be loosened for the insertion or removal of the lens without disturbing the temple connection.

In Fig. 6 there is shown a modified form of the invention wherein a substantially U-shaped clip member, as indicated by numeral 35, is used for connecting the end portions 15 and 16. The member 35 has a shelf or blade 36 fixedly attached at one end to the base portion 37 of the clip member 35 between the spaced arm portions 38 thereof, the arm portions 38 being initially spread apart as indicated in dotted outline. In assembling the device the blade 36 is inserted in the space between the end portions 15 and 16 of the transverse lens supporting arms 13 and 14 and the arms 38 of the clip member 35 are bent inwardly of the clip member 35 into intimate relation with notches provided therefor in the upper and lower surfaces of the portions 15 and 16 respectively, after which a threaded screw 39 may be inserted through concentric vertical openings in the arms 38, end portions 15 and 16 and blade 36.

An ornamental design over the front surface of the clip members 19 or 35 may be provided by fixedly securing an ornamental plate, as indicated by numeral 40 in Fig. 6, to the front edge of the blade 36 of clip member 35 or to the front edge of the blade 20 of the clip member 19 by any suitable securing means.

It is to be understood that other modifications may be made such as by providing a blade separable from the clip member, the blade having the ornamental plate previously affixed thereto.

It will be apparent that many changes may be made in the details of construction and arrangement of parts shown and described without departing from the spirit of the invention as expressed in the accompanying claims. Therefore, it is to be understood that all matters set forth or shown in the accompanying drawing are to be interpreted as illustrative and not in a limiting sense.

I claim:

1. In a lens supporting structure for the lenses of an ophthalmic mounting, a rim-member for encircling the marginal edge of a lens and being divided in the temporal region thereof, said rim-member having outwardly extending portions on opposed sides of said division, with said outwardly extending portions having inner surfaces disposed in adjacent relation and having aligned openings therethrough, one of said portions having a recess in the outer surfaces thereof communicating with said openings, and a plate member positioned between said inner surfaces and extending substantially throughout the area of said surfaces with the front side and rear edge surfaces thereof substantially flush with said edge surfaces of the outwardly extending portions and having an opening therein aligned with the openings in said portions, said plate member having a rearwardly extending perforated ear portion adjacent the outer end thereof to which a temple may be pivotally secured and having a relatively narrow elongated arm extending from the rear side of said plate member inwardly of and from adjacent the perforated ear and following contiguously the rear surface of one of said outwardly extending portions and terminating in a slightly enlarged perforated ear portion angled forwardly and to lie within the recess in the outer surface of said outwardly extending portion and with its perforation in alignment with the openings in the plate and outwardly extending portions, a connection member extendable through said aligned openings in the plate member and the outwardly extending portions of the rim member, and means for securing said connection member in connected relation with the ear portion of said elongated arm.

2. In a lens supporting structure for the lenses of an ophthalmic mounting, a rim-member for encircling the marginal edge of a lens and being divided in the temporal region thereof, said rim-member having outwardly extending portions on opposed sides of said division, with said outwardly extending portions having inner surfaces disposed in adjacent relation and having aligned openings therethrough, one of said portions having a recess in the outer surfaces thereof communicating with said openings, and a plate member positioned between said inner surfaces and extending substantially throughout the area of said surfaces with the front side and rear edge surfaces thereof substantially flush with said edge surfaces of the outwardly extending portions and having an opening therein aligned with the openings in said portions, said plate member having a rearwardly extending perforated ear portion adjacent the outer end thereof to which a temple may be pivotally secured and having a relatively narrow elongated arm extending from the rear side of said plate member inwardly of and from adjacent the perforated ear and following contiguously the rear surface of one of said outwardly extending portions and terminating in a slightly enlarged perforated ear portion angled forwardly and to lie within the recess in the outer surface of said outwardly extending portion and with its perforation in alignment with the openings in the plate and outwardly extending portions, and with said perforation in the ear portion of said elongated arm being threaded to provide means by which a connection member having threads adjacent the end thereof extended through said aligned openings may be secured so as to maintain the plate member and the outwardly extending portions of the rim-member in assembled relation.

3. In a lens supporting structure for the lenses of an ophthalmic mounting, a rim-member for encircling the marginal edge of a lens and being divided in the temporal region thereof, said rim-member having outwardly extending portions on opposed sides of said division, with said outwardly extending portions having inner surfaces disposed in adjacent relation and having aligned openings therethrough, one of said portions having a recess in the outer surfaces thereof communicating with said openings, and a plate member positioned between said inner surfaces and extending substantially throughout the area of said surfaces with the front side and rear surfaces thereof substantially flush with said edge surfaces of the outwardly extending portions and having an opening therein aligned with the openings in said portions, said plate member having a rearwardly extending perforated ear portion adjacent the outer end thereof to which a temple may be pivotally secured and having a relatively narrow elongated arm extending from the rear side of said plate member inwardly of and from adjacent the perforated ear and following contiguously the rear surface of one of said outwardly extending portions and terminating in a slightly enlarged perforated ear portion angled forwardly and to lie within the recess in the outer surface of said outwardly extending portion and with its perforation in alignment with the openings in the plate and outwardly extending portions, said plate member having a pin-like projection adapted to fit within a recess provided in the inner surface of the other outwardly extending portion to provide means for maintaining the outwardly extending portions in aligned relation.

DANIEL P. BERNHEIM.

REFERENCES CITED

The following references are of record in the file of this patent:

UNITED STATES PATENTS

| Number | Name | Date |
|---|---|---|
| 1,342,973 | Shreiner | June 8, 1920 |
| 1,698,047 | Boutelle | Jan. 8, 1929 |
| 2,281,812 | Uhlemann et al. | May 5, 1942 |